(12) United States Patent
Ishii

(10) Patent No.: US 11,526,815 B2
(45) Date of Patent: Dec. 13, 2022

(54) INFORMATION PROCESSING DEVICE, INFORMATION PROCESSING METHOD, RECORDING MEDIUM, AND SEAT RESERVATION SYSTEM

(71) Applicant: NEC Corporation, Tokyo (JP)

(72) Inventor: Shunsuke Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 993 days.

(21) Appl. No.: 15/763,191

(22) PCT Filed: Sep. 15, 2016

(86) PCT No.: PCT/JP2016/004204
§ 371 (c)(1),
(2) Date: Mar. 26, 2018

(87) PCT Pub. No.: WO2017/056430
PCT Pub. Date: Apr. 6, 2017

(65) Prior Publication Data
US 2019/0057325 A1 Feb. 21, 2019

(30) Foreign Application Priority Data

Sep. 30, 2015 (JP) ............................. JP2015-195037

(51) Int. Cl.
*G06Q 10/02* (2012.01)
*G06V 40/10* (2022.01)
(Continued)

(52) U.S. Cl.
CPC ............. *G06Q 10/02* (2013.01); *G06Q 10/04* (2013.01); *G06Q 20/127* (2013.01); *G06Q 20/20* (2013.01);
(Continued)

(58) Field of Classification Search
CPC ...... G06Q 10/02; G06Q 20/20; G06Q 20/127; G06Q 10/04; G06K 9/00362
(Continued)

(56) References Cited

U.S. PATENT DOCUMENTS

| | | | | |
|---|---|---|---|---|
| 2009/0063667 A1* | 3/2009 | Smith | .................... | G06Q 20/20 709/222 |
| 2012/0323612 A1* | 12/2012 | Callaghan | .......... | G06Q 30/0643 705/5 |

(Continued)

FOREIGN PATENT DOCUMENTS

| | | | |
|---|---|---|---|
| CN | 103971263 A | | 8/2014 |
| JP | H05-108675 A1 | | 4/1993 |

(Continued)

OTHER PUBLICATIONS

P. Faber, "Seat occupation detection inside vehicles," 4th IEEE Southwest Symposium on Image Analysis and Interpretation, 2000, pp. 187-191. https://ieeexplore.ieee.org/abstract/document/839597 (Year: 2000).*

(Continued)

*Primary Examiner* — Shannon S Campbell
*Assistant Examiner* — Lisa Ma
(74) *Attorney, Agent, or Firm* — Sughrue Mion, PLLC

(57) ABSTRACT

[Problem] To provide a technology enabling accurate recognition of an occupancy status of each seat, while reducing entire system cost.
[Solution] A server device 20 (information processing device) includes: a vacant seat information creation unit 210 configured to create vacant seat information indicating a vacant seat in a seat space, by processing an image received from an imaging means for capturing an image of the seat space; a seat selection unit 220 for performing a process of selecting a seat to be used by a customer, by the use of the
(Continued)

vacant seat information and in collaboration with a POS (Point of Sale) device (shop terminal 30) for handling payment for an item; and a seat information output unit 230 for outputting information indicating the selected seat.

18 Claims, 15 Drawing Sheets

(51) Int. Cl.
| | |
|---|---|
| *G07F 17/00* | (2006.01) |
| *G06Q 20/20* | (2012.01) |
| *G07F 17/40* | (2006.01) |
| *G06Q 50/12* | (2012.01) |
| *G08B 5/22* | (2006.01) |
| *G06Q 20/12* | (2012.01) |
| *G06Q 10/04* | (2012.01) |
| *G06V 20/52* | (2022.01) |

(52) U.S. Cl.
CPC ........... *G06Q 20/202* (2013.01); *G06Q 50/12* (2013.01); *G06V 40/10* (2022.01); *G07F 17/0014* (2013.01); *G07F 17/40* (2013.01); *G08B 5/221* (2013.01); *G06V 20/52* (2022.01)

(58) Field of Classification Search
USPC ............................................................ 705/5
See application file for complete search history.

(56) References Cited

U.S. PATENT DOCUMENTS

| | | | | |
|---|---|---|---|---|
| 2013/0325526 | A1* | 12/2013 | Tyler | G06Q 10/02 |
| | | | | 705/5 |
| 2014/0211985 | A1* | 7/2014 | Polese | G06V 40/10 |
| | | | | 382/103 |
| 2014/0214484 | A1 | 7/2014 | Hirakawa et al. | |
| 2014/0365251 | A1 | 12/2014 | Tejima | |
| 2017/0068863 | A1* | 3/2017 | Rattner | G06V 40/10 |
| 2017/0116489 | A1* | 4/2017 | Porsch | G06V 40/16 |
| 2017/0200355 | A1* | 7/2017 | Gruenbaum | G08B 5/221 |

FOREIGN PATENT DOCUMENTS

| | | | |
|---|---|---|---|
| JP | H05-242107 A | | 9/1993 |
| JP | 2002-311170 A | | 10/2002 |
| JP | 2003-044944 A | | 2/2003 |
| JP | 2006-039748 A | | 2/2006 |
| JP | 2006-260144 A | | 9/2006 |
| JP | 2011-170819 A | | 9/2011 |
| JP | 2011-187031 A | | 9/2011 |
| JP | 2014-146154 A | | 8/2014 |
| JP | 2017033297 A | * | 2/2017 |

OTHER PUBLICATIONS

Japanese Office Action for JP Application No. 2015-195037 dated Jun. 30, 2020 with English Translation.
Japanese Office Action for JP Application No. 2015-195037 dated Nov. 6, 2020 with English Translation.
International Search Report for PCT Application No. PCT/JP2016/004204, dated Nov. 8, 2016.
English translation of Written opinion for PCT Application No. PCT/JP2016/004204.
Chinese Office Action for CN Application No. 201680056921.7 dated May 28, 2021 with English Translation.

* cited by examiner

| TABLE ID | SEAT ID | OCCUPANCY INFORMATION |
|---|---|---|
| 001 | 001 | ○ |
| | 002 | ○ |
| | 003 | ○ |
| | 004 | ○ |
| 002 | 001 | — |
| | 002 | — |
| 003 | 001 | — |
| | 002 | — |
| ⋮ | ⋮ | ⋮ |

| TABLE ID | SEAT ID | OCCUPANCY START TIME INFORMATION | WAITING RESERVATION INFORMATION | PREDICTED VACANCY START TIME |
|---|---|---|---|---|
| 001 | 001 | 12:10 | 1 | 12:40 |
| | 002 | 12:10 | 1 | 12:40 |
| | 003 | 12:10 | 1 | 12:40 |
| | 004 | 12:10 | 1 | 12:40 |
| 002 | 001 | 12:30 | 1 | 13:00 |
| | 002 | 12:30 | 1 | 13:00 |
| 003 | 001 | 11:50 | 2 | 12:50 |
| | 002 | 11:50 | 2 | 12:50 |
| ⋮ | ⋮ | ⋮ | ⋮ | ⋮ |

| CUSTOMER CLASS | AVERAGE OCCUPANCY TIME |
|---|---|
| GROUP INCLUDING CHILDREN | ○○MINUTES |
| HOUSEWIVES | ××MINUTES |
| ADULT FEMALE | △△MINUTES |
| ADULT MALE | □□MINUTES |
| ⋮ | ⋮ |

(b)

| TIME SLOT | AVERAGE OCCUPANCY TIME |
|---|---|
| MORNING | ○○○MINUTES |
| AFTERNOON | ×××MINUTES |
| EVENING | △△△MINUTES |
| NIGHT | □□□MINUTES |

(c)

| DAY | AVERAGE OCCUPANCY TIME |
|---|---|
| WEEKDAY | ○○○○MINUTES |
| HOLIDAY | ××××MINUTES |

| WAITING TIME | COUPON INFORMATION |
|---|---|
| LESS THAN 10 MINUTES | 10%OFF |
| 10 TO 30 MINUTES | 20%OFF |
| MORE THAN 30 MINUTES | 30%OFF |

INFORMATION PROCESSING DEVICE, INFORMATION PROCESSING METHOD, RECORDING MEDIUM, AND SEAT RESERVATION SYSTEM

This application is a National Stage Entry of PCT/JP2016/004204 filed on Sep. 15, 2016, which claims priority from Japanese Patent Application 2015-195037 filed on Sep. 30, 2015, the contents of all of which are incorporated herein by reference, in their entirety.

TECHNICAL FIELD

The present invention relates to technology of managing a seat space occupancy status.

BACKGROUND ART

In a place such as a food court, where a customer can select any seat the customer likes, it is general that a customer visits a shop to purchase an item after securing a seat. For shops, it is desirable to reduce staying time per customer and accordingly increase customer turnover.

An example of a technology related to such a matter is described in Patent Literature 1 (PTL 1) as follows. PTL 1 discloses a technology which, after an order for an item is made by the use of a ticket-vending machine, displays on a display a seat occupancy status in a guest room when requested, and thereby makes a seat reservation at the same time. According to the technology disclosed in PTL 1, ordering for an item and securing of a seat can be performed at the same time, and it accordingly is possible to reduce necessary time for securing a seat and consequently reduce staying time per customer. Patent Literature 2 (PTL 2) and Patent Literature 3 (PTL 3) each disclose a technology of predicting a vacant seat.

CITATION LIST

Patent Literature

[PTL 1] Japanese Laid-Open Patent Application No. 2003-44944
[PTL 2] Japanese Laid-Open Patent Application No. 05-242107
[PTL 3] United States Patent Application Publication No. 2014/0365251

SUMMARY OF INVENTION

Technical Problem

However, in the technology disclosed in PTL 1, it is necessary, for the purpose of displaying a vacant seat in a guest room on the ticket-vending machine, that a shop clerk checks an image of the guest room by visual observation and accordingly inputs a location of a vacant seat manually, or that determination of a vacant seat is performed by disposing a sensor at each seat and using information provided from the sensors. Accordingly, the technology requires considerable human effort and high equipment cost. Further, PTL 2 and PTL 3 are not sufficient as a practical technology for determining a vacant seat.

An objective of the present invention is to provide a technology for improving customer turnover while reducing human effort and equipment cost.

Solution to Problem

According to one aspect of the present invention,
there is provided an information processing device including:
a vacant seat information creation means for creating vacant seat information indicating a vacant seat in a seat space, by processing an image received from an imaging means for capturing an image of the seat space;
a seat selection means for performing a process of selecting a seat to be used by a customer, by the use of the vacant seat information and in collaboration with a POS (Point of Sale) device for handling payment for an item; and
a seat information output means for outputting information indicating the selected seat.

According to one aspect of the present invention,
there is provided an information processing method including:
creating vacant seat information indicating a vacant seat in a seat space, by processing an image received from an imaging means for capturing an image of the seat space;
performing a process of selecting a seat to be used by a customer, by the use of the vacant seat information and in collaboration with a POS (Point of Sale) device for handling payment for an item; and
outputting information indicating the selected seat.

According to one aspect of the present invention,
there is provided a program for causing a computer to function as:
a vacant seat information creation means for creating vacant seat information indicating a vacant seat in a seat space, by processing an image received from an imaging means for capturing an image of the seat space;
a seat selection means for performing a process of selecting a seat to be used by a customer, by the use of the vacant seat information and in collaboration with a POS (Point of Sale) device for handling payment for an item; and
a seat information output means for outputting information indicating the selected seat.

According to one aspect of the present invention,
there is provided a seat reservation system including:
an imaging means for capturing an image of a seat space;
a POS (Point of Sale) device for handling payment for an item; and
an information processing device,
wherein the information processing device includes:
a vacant seat information creation means for creating vacant seat information indicating a vacant seat in a seat space, by processing an image received from the imaging means for capturing an image of the seat space;
a seat selection means for performing a process of selecting a seat to be used by a customer, by the use of the vacant seat information and in collaboration with the POS (Point of Sale) device for handling payment for an item; and
a seat information output means for outputting information indicating the selected seat.

Advantageous Effects of Invention

According to the present invention, it becomes possible to improve customer turnover while reducing human effort and equipment cost.

BRIEF DESCRIPTION OF DRAWINGS

FIG. 2 is a diagram showing an example of information stored in a vacant seat information storage unit.

FIG. 9 is a diagram showing a configuration of a vacant seat information storage unit in a second example embodiment.

FIG. 10 is a diagram showing, in a table form, information used by a vacant seat information creation unit when creating a predicted seat vacancy time.

FIG. 14 is a diagram showing, in a table form, an example of information stored in a coupon information storage unit.

EXAMPLE EMBODIMENT

First Example Embodiment

System Configuration

Figure 1:
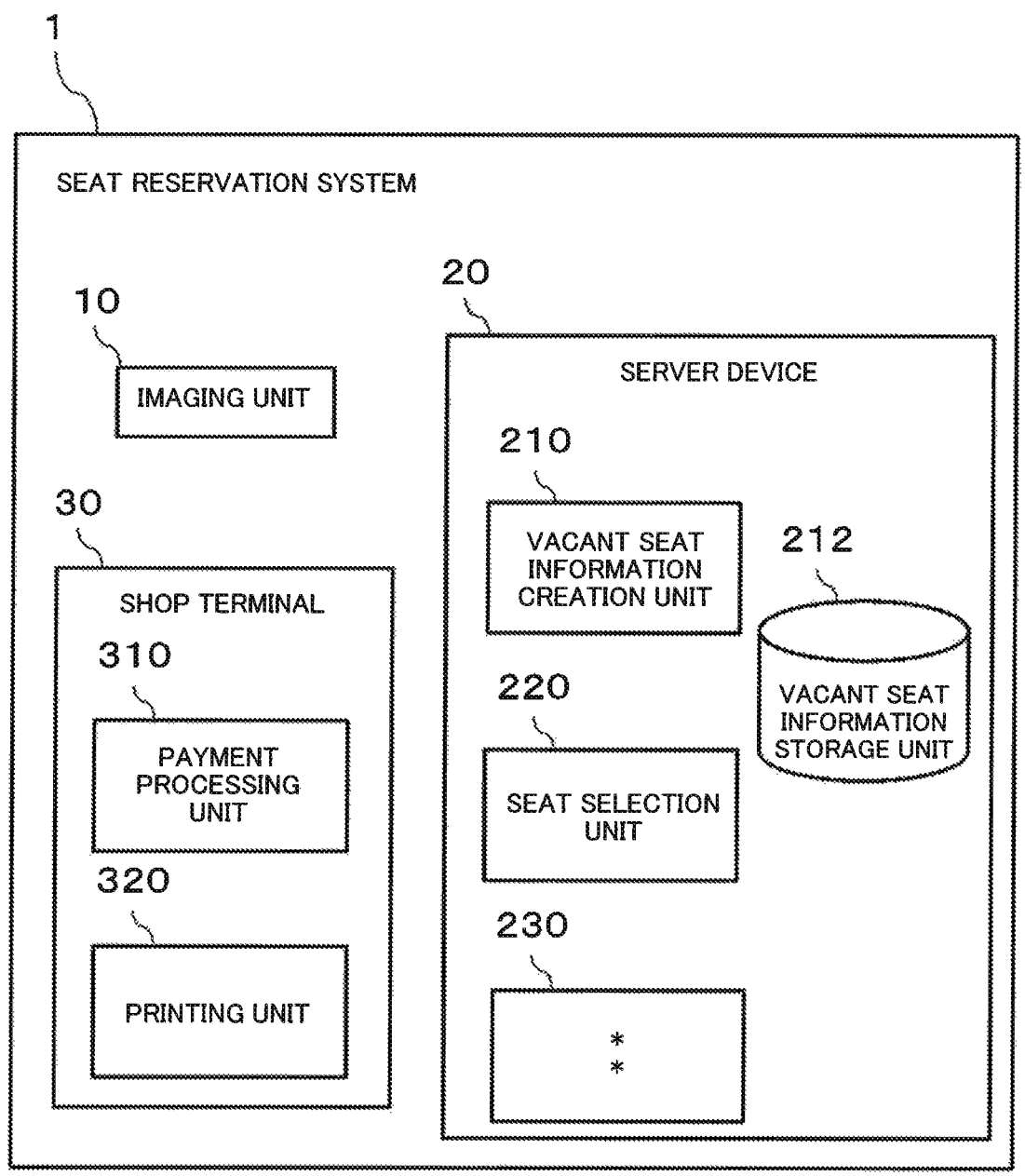
FIG. 1 is a block diagram conceptually showing a system configuration of a seat reservation system of a first example embodiment.

FIG. 1 is a block diagram conceptually showing a system configuration of a seat reservation system 1 of a first example embodiment. As shown in FIG. 1, the seat reservation system 1 of the present example embodiment includes an imaging unit 10, a server device 20 and a shop terminal 30.

The imaging unit 10 is a camera or the like disposed on a ceiling or a wall in a seat space offered for customers' free use, and includes at least part of the seat space in its capture range.

The server device 20 is an example of an information processing device (according to the present invention), which manages an occupancy status of the seat space by the use of an image received from the imaging unit 10. Specifically, a vacant seat information creation unit 210 receives an image captured by the imaging unit 10 and performs processing of the image, thereby creating information which indicates a vacant seat in the seat space (vacant seat information). The vacant seat information creation unit 210 stores the created vacant seat information into a vacant seat information storage unit 212. For example, the vacant seat information storage unit 212 stores information shown in FIG. 2.

FIG. 2 is a diagram showing an example of information stored in the vacant seat information storage unit 212 of the first example embodiment. In FIG. 2, the vacant seat information storage unit 212 stores information indicating whether each seat is occupied or not (occupancy information), in a manner to associate the occupancy information with information for identifying each table (table ID) and information for identifying a seat of a table (seat ID). The occupancy information is updated according to a result of processing of an image received from the imaging unit 10. Further, reservation information is updated according to a seat selection process performed by a seat selection unit 220, as follows. Specifically, in response to a request from a device such as the shop terminal 30, the vacant seat information stored in the vacant seat information storage unit 212 is displayed on a display of the device having made the request, and is used for determining a seat to be used by a customer. The seat selection unit 220 accepts, from the shop terminal 30, input information for selecting a seat input to the shop terminal 30 through an input device, which is not illustrated, and, using the input information, updates the column of "occupancy information" of the vacant seat information stored in the vacant seat information storage unit 212. Thus, in collaboration with the shop terminal 30, the seat selection unit 220 performs the selection process of a seat to be used by a customer, by the use of the vacant seat information created by the vacant seat information creation unit 210.

A seat information output unit 230 outputs information indicating a seat reserved by the seat selection unit 220. Here, "output" includes, for example, output to a printing device such as a printer coupled via a network and output to a mobile terminal via short-range communication or a network, such as a notification message and an email.

The shop terminal 30 is a terminal which is disposed at each shop and used for performing a payment process for an item, or the like. For example, the shop terminal 30 is a POS (Point of Sale) device. The shop terminal 30 may be either a desktop terminal or a mobile terminal such as a tablet terminal. A payment processing unit 310 performs payment for an item subjected to the payment. A printing unit 320 prints out the information indicating a seat reserved by the seat selection unit 220, on a paper medium.

Hardware Configuration

Figure 3:
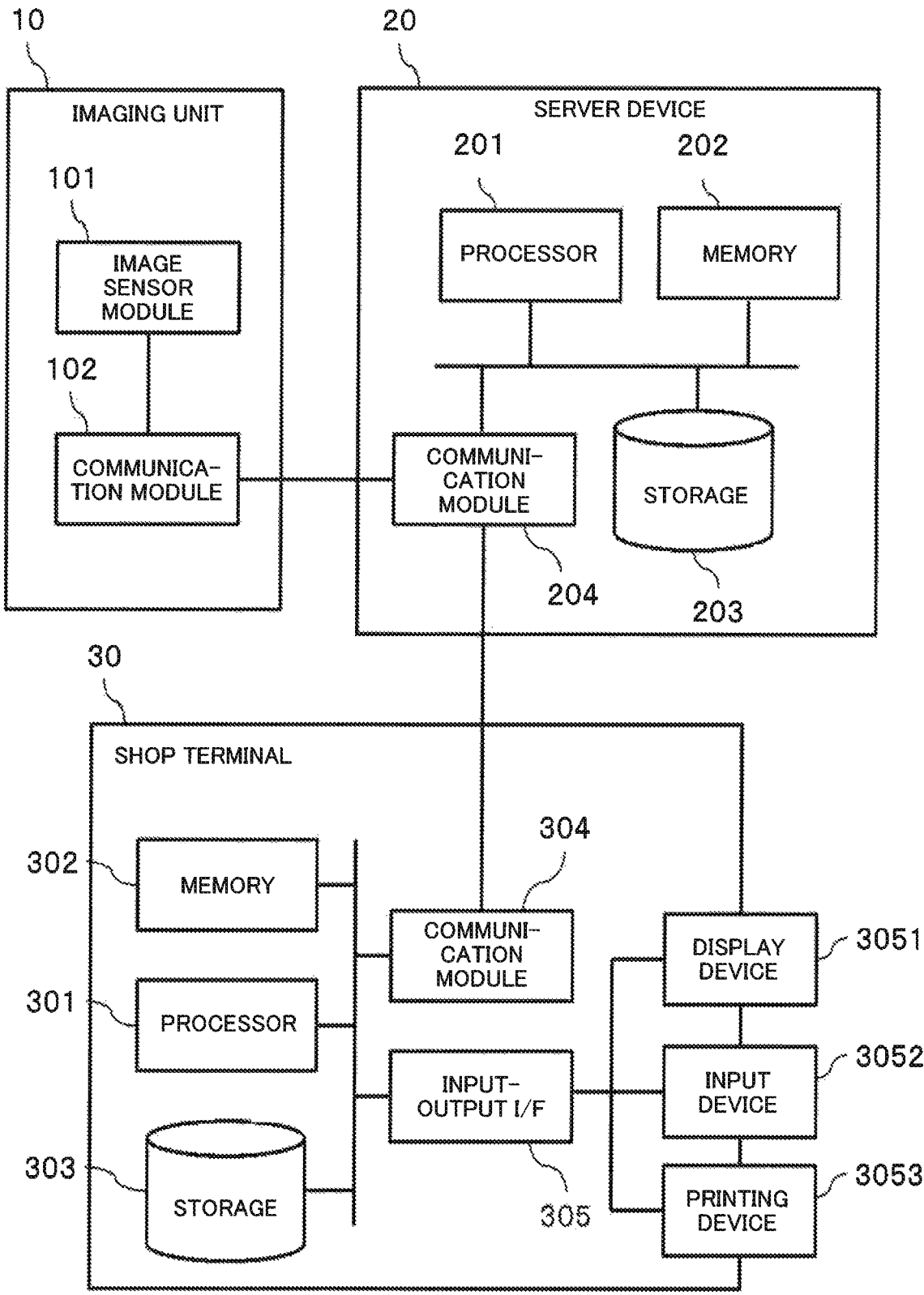
FIG. 3 is a diagram conceptually showing a hardware configuration of a seat reservation system.

FIG. 3 is a diagram conceptually showing a hardware configuration of the seat reservation system 1 of the first example embodiment.

Hardware Configuration of the Imaging Unit 10

The imaging unit 10 includes an image sensor module 101 for capturing an image and a data communication module 102 for communicating with an external device via a wired or wireless network. The image sensor module 101 includes, for example, an image sensor, such as a CCD (Charge Coupled Device), lenses, and the like. The data communication module 102 communicates with the server device 20, thereby transmitting image data generated by the image sensor module 101.

Hardware Configuration of the Server Device 20

The server device 20 includes a processor 201, a memory 202, a storage 203 and a data communication module 204. The processor 201 is, for example, an operation processing device such as a CPU (Central Processing Unit) and a GPU (Graphics Processing Unit). The memory 202 is, for example, a memory such as a RAM (Random Access Memory) and a ROM (Read Only Memory). The storage 203 is, for example, a storage device such as an HDD (Hard Disk Drive), an SSD (Solid State Drive) and a memory card. The storage 203 may also be a memory such as a RAM and a ROM.

The storage 203 stores programs for implementing functions of respective ones of processing units included in the server device 20 (the vacant seat information creation unit 210, the seat selection unit 220, the seat information output unit 230, and the like). By executing the programs, the processor 201 implements the functions of the respective processing units. Here, when executing the programs, the processor 201 may perform the execution either after reading the programs into the memory 202 or without reading the programs into the memory 202. Further, the storage 203 functions also as the vacant seat information storage unit 212.

The data communication module 204 transmits and receives data to and from an external device via a wired network or a wireless network. For example, using the data communication module 204, the server device 20 receives an image from the image sensor module 101 of the imaging unit 10. Also using the data communication module 204, the server device 20 transmits the vacant seat information stored in the vacant seat information storage unit 212 to the shop terminal 30.

Hardware Configuration of the Shop Terminal 30

The shop terminal 30 includes a processor 301, a memory 302, a storage 303, a data communication module 304 and an input-output interface (I/F) 305. The processor 301, memory 302 and storage 303 are similar to those of the server device 20. In the storage 303, various programs for implementing functions of the payment processing unit 310 are stored. By the processor 301 executing the programs, the functions of the payment processing unit 310 are implemented.

The data communication module 304 transmits and receives data to and from an external device via a wired network or a wireless network. Using the data communication module 304, the shop terminal 30 sends a transmission request for vacant seat information to the server device 20, and receives vacant seat information transmitted from the server device 20 in response to the transmission request. Further, the data communication module 304 enables short-range wireless communication such as Bluetooth (registered trademark). Using the short-range wireless communication, the shop terminal 30 transmits information indicating a selected seat to, for example, a mobile terminal of a customer of the shop.

The input-output interface 305 is coupled with a display device 3051, an input device 3052, a printing device 3053 and the like. The display device 3051 is a device for displaying a screen corresponding to drawing data having been processed by the processor 301, such as an LCD (Liquid Crystal Display) and a CRT (Cathode Ray Tube) display. The input device 3052 is a device for accepting an operator's operational input, for example, such as a keyboard, a mouse and a touch sensor. The display device 3051 and the input device 3052 may be integrated together to be implemented as a touch panel. The printing device 3053 includes a mechanism for feeding print papers set in advance, a mechanism for printing, on the print papers, print data having been processed by the processor 301, and a mechanism for cutting the print papers. The mechanisms of the printing device 3053 operate according to control instructions transmitted from the processor 301. Specifically, according to the control instructions from the processor 301, the printing deice 3053 prints out, onto a paper medium, information indicating a seat selected by the seat selection unit 220.

Here, a hardware configuration of the seat reservation system 1 is not limited to that of FIG. 3.

Example of Operation

Figure 4:
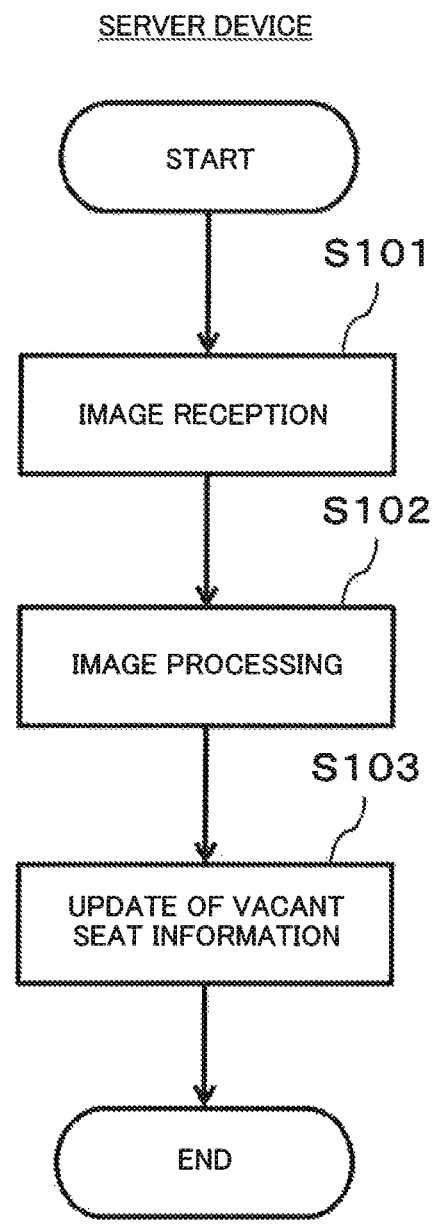
FIG. 4 is a flow chart showing a flow of a process of updating vacant seat information performed by a vacant seat information creation unit.
Figure 5:
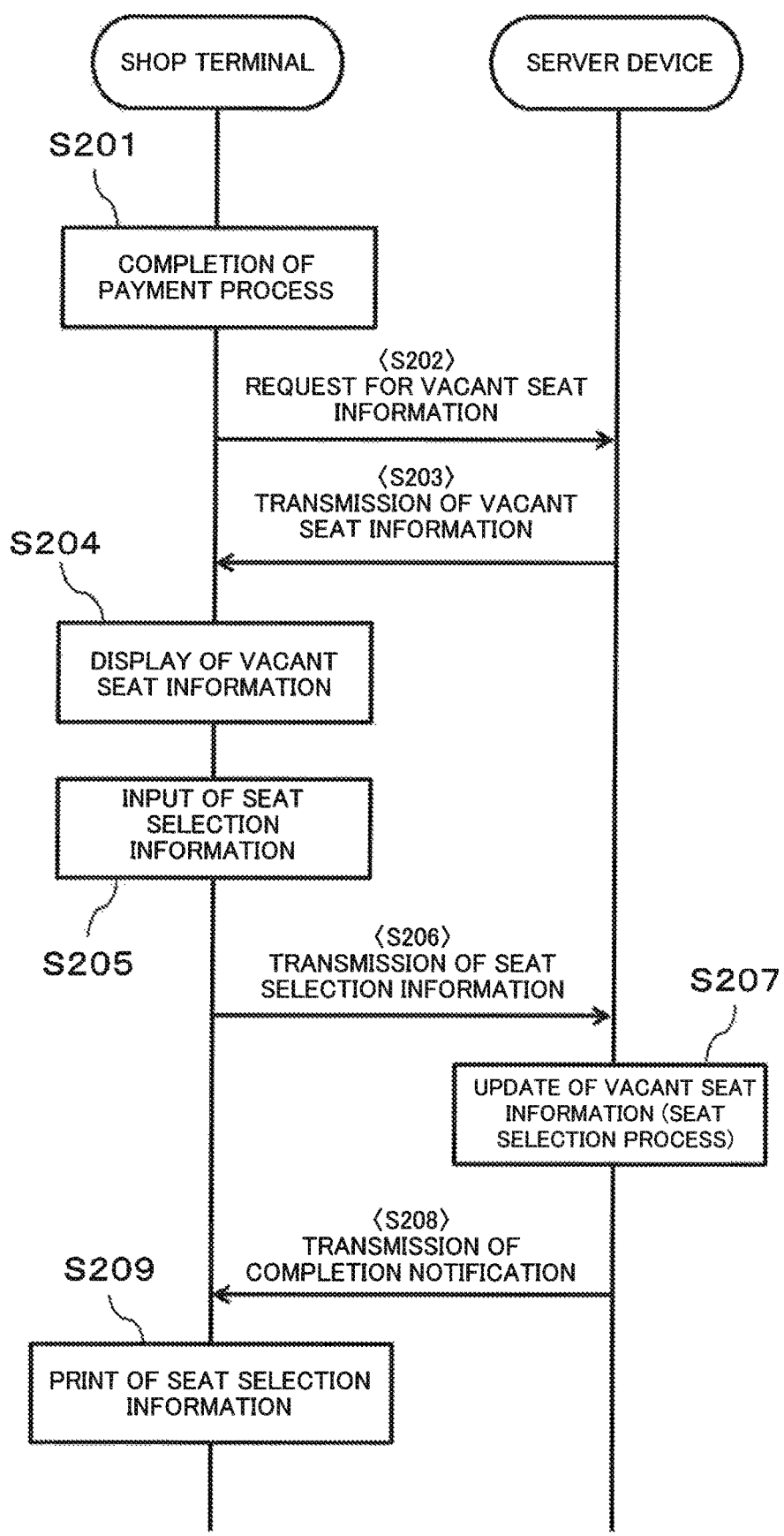
FIG. 5 is a sequence diagram showing a flow of a process performed by a seat selection unit.

With reference to FIGS. 4 and 5, a process flow of the seat reservation system 1 of the present example embodiment will be described.

First, with reference to FIG. 4, a flow of creation of vacant seat information by the vacant seat information creation unit 210 will be described. FIG. 4 is a flow chart showing a flow of a process of updating vacant seat information performed by the vacant seat information creation unit 210 of the first example embodiment.

The vacant seat information creation unit 210 of the server device 20 receives an image from the imaging unit 10 (S101). The image received from the imaging unit 10 may be either a video image or a still image. The vacant seat information creation unit 210 performs processing of the received image and thereby analyzes an occupancy status of a seat space (S102). Specifically, the vacant seat information creation unit 210 determines whether a human region or a region of a predetermined object, such as a tray, is present at a position of each seat. In that process, the vacant seat information creation unit 210 may store, in advance, regions in an image captured by the imaging unit 10 where, respectively, a person and an object such as a tray are to have been captured when a corresponding seat is occupied. Then, depending on a result of the above-described determination, the vacant seat information creation unit 210 stores information indicating "occupancy" or that indicating "vacancy" into the column of "occupancy information" shown in FIG. 2, thus updating the vacant seat information (S103).

Next, with reference to FIG. 5, a flow of a selection process of a seat desired by a customer will be described. FIG. 5 is a sequence diagram showing a process flow of the seat selection unit 220 of the first example embodiment.

First, after completion of a payment process by the shop terminal 30 (S201), the server device 20 requests the shop terminal 30 to transmit vacant seat information (S202). Here, the "completion of a payment process" does not mean any particularly limited state, but does such as a time when, at the shop terminal 30, a button for performing a process of finalizing an amount of received money, such as a "subtotal button", is pressed or when a receipt is issued after completion of money transfer.

The server device 20 transmits vacant seat information stored in the vacant seat information storage unit 212, in response to a request for vacant seat information (S203). Using the received vacant seat information, the shop terminal 30 creates a screen enabling identification of a vacant seat in a seat space, and displays the screen on a display of the shop terminal 30 (S204). A shop clerk operating the shop terminal 30 or a customer of the shop checks the screen displayed on the display, and inputs information for selecting a desired table and seat (seat selection information) via an input device of the shop terminal 30 (S205). The seat selection information thus input is transmitted to the server device 20 (S206). The seat selection information includes information for identifying the selected table (a table ID), information for identifying the selected seat (a seat ID) and the like.

Using the table ID and seat ID included in the received seat selection information, the seat selection unit 220 of the server device 20 updates vacant seat information stored in the vacant seat information storage unit 212 (S207). Specifically, the seat selection unit 220 refers to the vacant seat information storage unit 212 by the use of the table ID and seat ID included in the seat selection information, and stores information indicating that the seat is scheduled to be immediately occupied or information indicating that the seat is currently occupied, into the "occupancy information" associated with the table ID and seat ID. As a result, the seat to be used by the customer is finally determined. On completion of the process, the server device 20 transmits a notification indicating that the seat has been secured, to the shop terminal 30 (S208). When the notification is received by the shop terminal 30, the printing unit 320 outputs information indicating the selected seat, using seat reservation information in input in the step S204 (S209). For example, the printing unit 320 prints out a seat number of the secured seat, a map indicating a position of the seat, or the like, onto a paper medium, using the printing device 3053. The shop terminal 30 may also output the information about the secured seat to a mobile terminal of the customer via short-range wireless communication, an email or the like.

Functions and Effects of the First Example Embodiment

As has been described above, in the present example embodiment, vacant seat information is created using an image captured by the imaging unit 10, and using the vacant seat information, a seat to be used by a customer is secured by the shop terminal 30. Accordingly, for example, even if a customer does not take a seat selected in the process of the steps S205 to S207 for some reason and there accordingly occurs discrepancy between a seat vacancy status indicated by vacant seat information and an actual seat vacancy status, it is possible to subsequently make correction using an image received from the imaging unit 10. Further, from an image received from the imaging unit 10, a seat vacancy status of a plurality of seats included in the capture range may be automatically recognized. Accordingly, it becomes unnecessary to check an occupancy status by visual observation and also to provide at each seat a configuration for determining an occupancy status of the seat, and as a result, an effect of reducing human effort and equipment cost can be expected. Further, as a result of outputting of information indicating a selected seat to, for example, a paper medium or the like, there is expected also an effect that a customer is correctly guided to the seat and, accordingly, occurrence of a problem of taking a wrong seat is prevented.

Modified Examples of the First Example Embodiment

While it has been described above that the seat selection is performed on the side of the shop terminal 30, the seat selection process may be performed automatically on the side of the server device 20.

Figure 6:
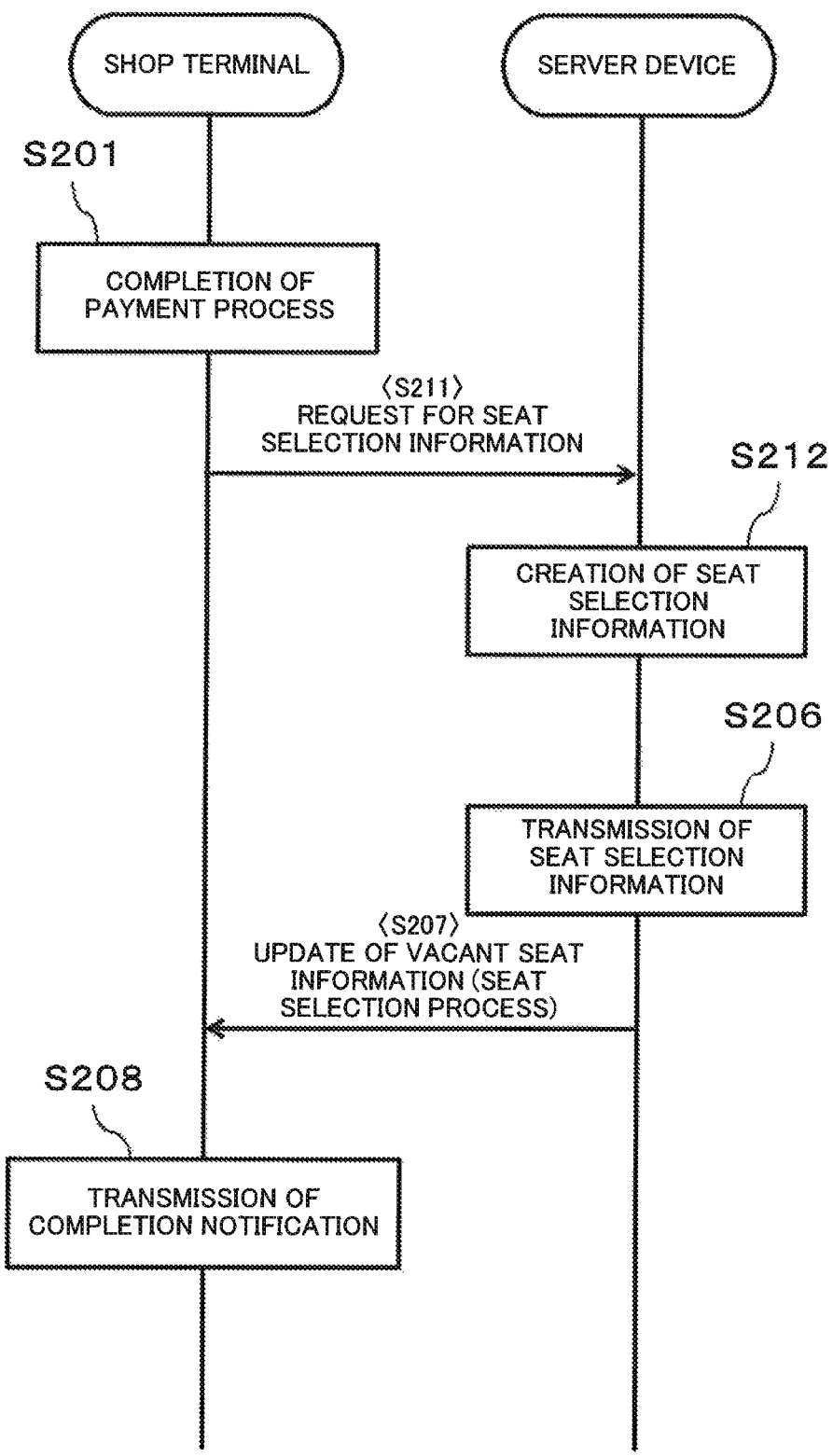
FIG. 6 is a sequence diagram showing a first modified example of FIG. 5.

For example, the configuration may be such that, as shown in FIG. 6, when a request for seat selection information is transmitted from the shop terminal 30 (S211) after completion of a payment process (S201), the seat selection unit 220 of the server device 20 automatically selects a vacant seat based on vacant seat information and accordingly creates seat selection information (S212). In that case, for example, the seat selection unit 220 has information representing distances of respective seats from the shop terminal 30 stored in advance, and automatically selects a nearest seat with reference to the information representing the distances. Further, the seat selection unit 220 may identify an area of low customer density from the vacant seat information and accordingly select a seat in the identified area automatically. In that way, there may be expected an effect of further reducing time for seat selection and thereby reducing average occupancy time per customer.

Figure 7:
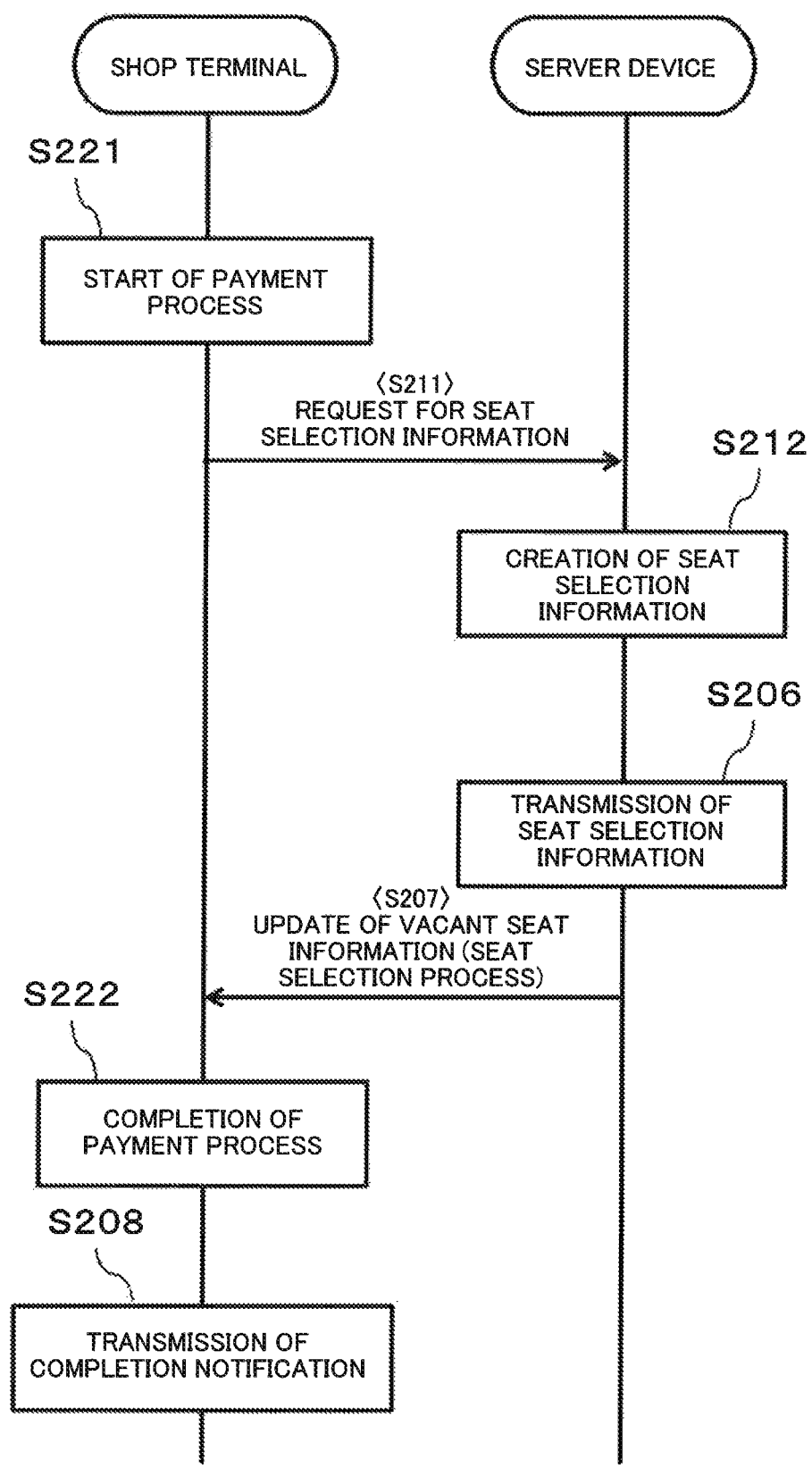
FIG. 7 is a sequence diagram showing a second modified example of FIG. 5.

Further, for example, as shown in FIG. 7, a request for seat selection information may be transmitted at the same time as when a payment process is started (S221). In that case, on completion of the payment process, information indicating a selected seat is output from the printing unit 320 of the shop terminal 30 or the like (S222).

Figure 8:
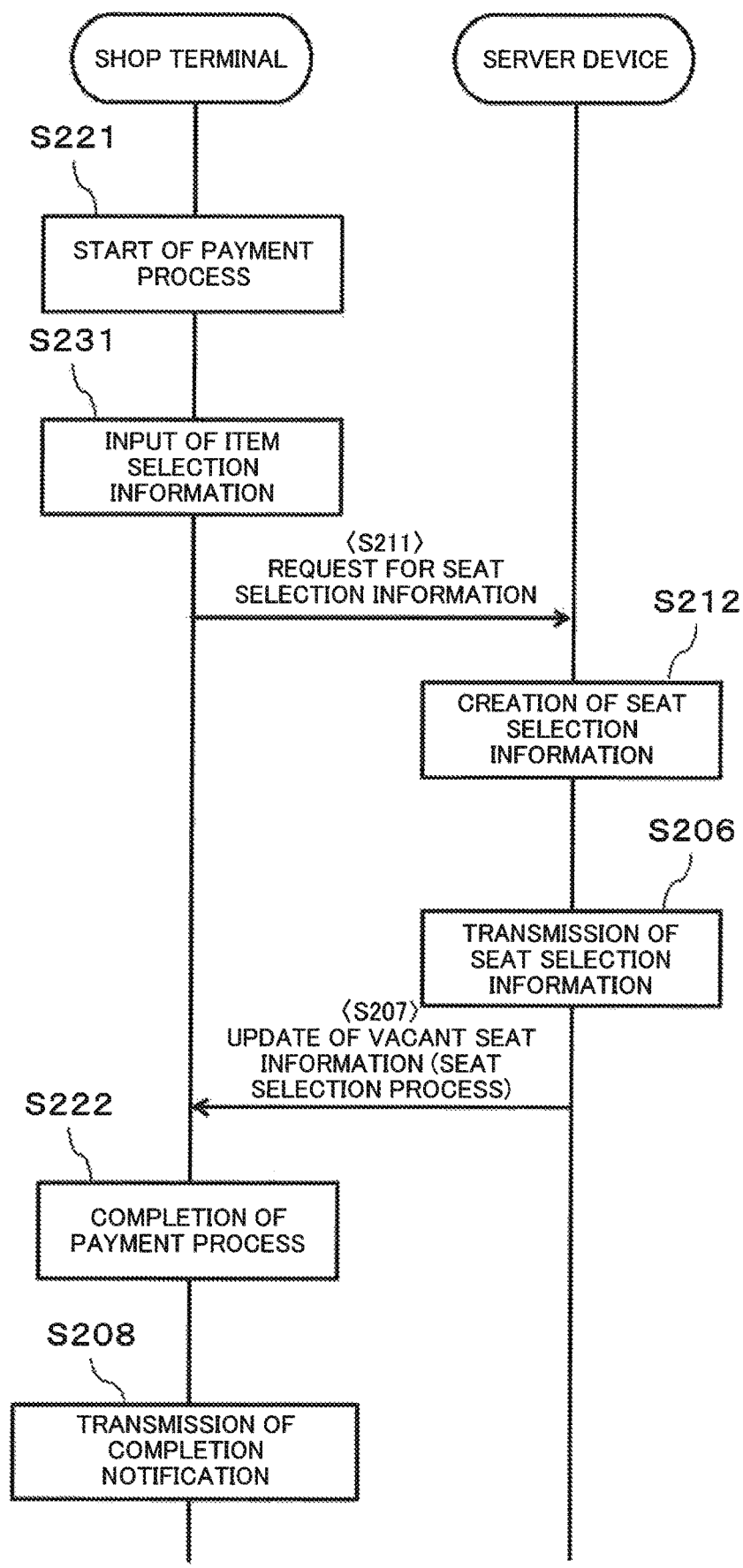
FIG. 8 is a sequence diagram showing a third modified example of FIG. 5.

Further, for example, as shown in FIG. 8, a request for seat selection information may be transmitted (S211) during a payment process (for example, at a time when information on an item selected by a customer has been input (S231)). Also in that case, on completion of the payment process, information indicating a selected seat is output from the printing unit 320 of the shop terminal 30 or the like (S222).

Further, the process flow of FIG. 4 may be configured similarly to the above-described cases so that the shop terminal 30 transmits an acquisition request for vacant seat information at a time of starting a payment process or during the payment process. In that case, on completion of the payment process, information indicating a selected seat is output from the printing unit 320 of the shop terminal 30.

Second Example Embodiment

In the present example embodiment, the seat reservation system 1 can accept a plurality of reservations for each seat. Further, with respect to a currently occupied seat, the server device 20 calculates a time at which the seat is predicted to become vacant (hereafter, referred to as a predicted vacancy time), and stores the time in the vacant seat information storage unit 212. The predicted vacancy start time is used when the server device 20 selects a seat in a reservation process.

System Configuration

FIG. 9 is a diagram showing a configuration of the vacant seat information storage unit 212 in the present example embodiment. In an example shown in the diagram, the vacant seat information storage unit 212 stores, for each seat, a time at which the seat has become occupied (occupancy start time information), as information indicating an occupancy status of the seat. The time (occupancy start time information) is created by the vacant seat information creation unit 210. Further, the vacant seat information storage unit 212 stores, for each seat, also the number of pieces of reservation information (waiting reservation information) and a predicted vacancy start time. These kinds of information also are created by the vacant seat information creation unit 210.

For example, on detecting that, in an image received from the imaging unit 10, a person or a predetermined object such as a tray has been captured to be present at a seat which is indicated to be "vacant" in the "occupancy information" associated with the seat, the vacant seat information creation unit 210 determines that the seat has become occupied. The vacant seat information creation unit 210 regards a time at which it has determined that the seat has become occupied as a time at which the seat has become occupied, thereby creating occupancy start time information.

FIG. 10 is a diagram showing, in a table form, information used when the vacant seat information creation unit 210 creates a predicted vacancy start time.

When using information shown in FIG. 10(a), the vacant seat information creation unit 210 determines an attribute of a customer using a seat (table), by image processing. Here, in the vacant seat information creation unit 210, a length of time during which a seat is occupied (average occupancy time) is stored in advance, in terms of each attribute. Accordingly, the vacant seat information creation unit 210 creates a predicted vacancy start time by reading an average occupancy time associated with the attribute determined by image processing and adding the read average occupancy time to a time at which the seat (table) became occupied.

When using information shown in FIG. 10(b), the vacant seat information creation unit 210 stores in advance a length of time during which a seat is occupied (average occupancy time), in terms of each time slot. The stored information is not restricted to that shown in FIG. 10(b), but the vacant seat information creation unit 210 may store an average occupancy time in terms of a more precise unit (for example, at one hour interval, or the like). Then, the vacant seat information creation unit 210 creates a predicted vacancy start time by reading an average occupancy time associated with a time slot corresponding to the current time and adding the read average occupancy time to a time at which the seat (table) became occupied.

When using information shown in FIG. 10(c), the vacant seat information creation unit 210 stores in advance, a length of time during which a seat is occupied (average occupancy time), in terms of each of weekday and holiday. The stored information is not restricted to that shown in FIG. 10(c), but the vacant seat information creation unit 210 may store an average occupancy time in terms of a more precise unit (for example, in terms of each day in a week, or the like). Then, the vacant seat information creation unit 210 creates a predicted vacancy start time by reading an average occupancy time associated with the current day and adding the read average occupancy time to a time at which the seat (table) became occupied.

Further, the vacant seat information creation unit 210 calculates a predicted vacancy start time according to also the number of reservations indicated by "reservation information" in FIG. 9. For example, the vacant seat information creation unit 210 may estimate a predicted vacancy start time, by multiplying an average occupancy time read from the information shown in FIG. 10(b) or 10(c) by the number of waiting reservations and adding the product to a time indicated by the occupancy start time information. The vacant seat information creation unit 210 may perform the estimation of a predicted vacancy start time also by reading an average occupancy time associated with a class of a waiting customer from the information shown in FIG. 10(a). In that case, another imaging unit for capturing an image of a customer having selected waiting until a seat becomes vacant is disposed at or around the shop terminal 30, and the vacant seat information creation unit 210 determines a customer class of the waiting customer by analyzing an image received from the another imaging unit. Then, the vacant seat information creation unit 210 reads an average occupancy time associated with the determined customer class from the information shown in FIG. 10(a) and adds the average occupancy time to a current predicted vacancy start time, thereby estimating a predicted vacancy start time in which the average occupancy time of the customer waiting for a vacant seat is taken into account.

When the vacant seat information indicates a full occupancy state, the seat selection unit 220 of the present example embodiment performs a waiting reservation process on a seat whose predicted vacancy start time stored in the vacant seat information storage unit 212 is the earliest. Then, the seat information output unit 230 of the present example embodiment outputs information indicating the seat having been reserved by the waiting reservation process. The printing unit 320 of the shop terminal 30 prints out the information indicating the seat having been reserved by the waiting reservation process, which is acquired from the seat information output unit 230.

Hardware Configuration

The seat reservation system 1 of the present example embodiment has a similar hardware configuration to that in the first example embodiment. The storage 203 stores a program for implementing the above-described function of the vacant seat information creation unit 210 of the present example embodiment, and by the processor 201 executing the program, the vacant seat information creation unit 210 of the present example embodiment is implemented. The storage 203 of the present example embodiment further stores information to be used for calculating an average occupancy time, such as that shown in FIGS. 10(a) to (c).

Example of Operation

Figure 11:
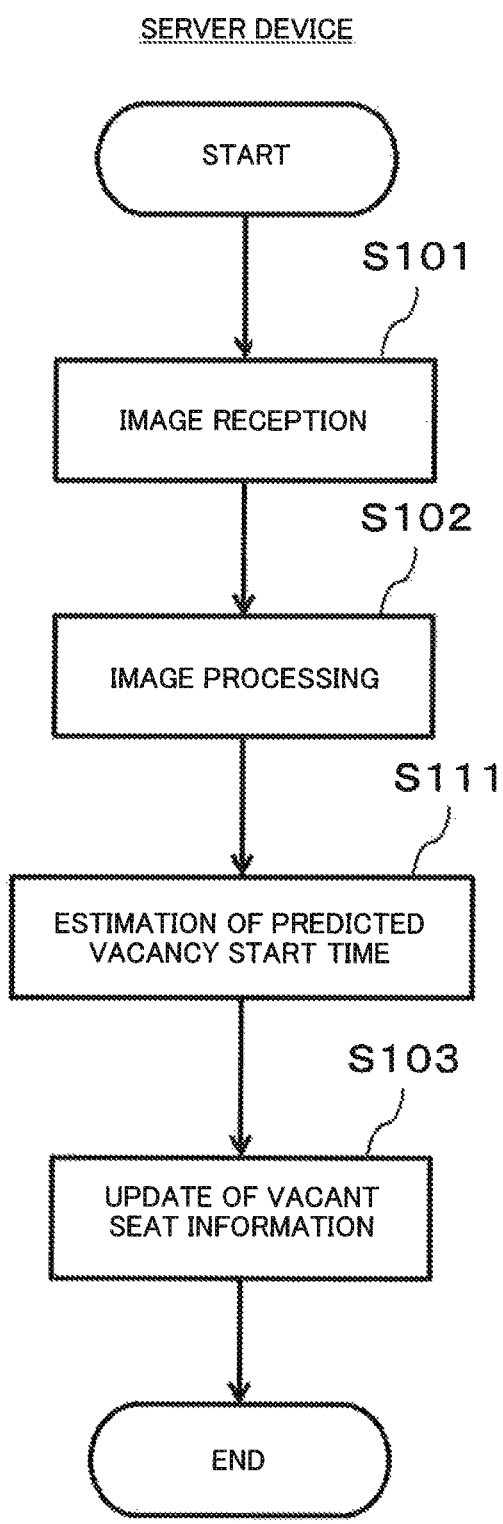
FIG. 11 is a sequence diagram showing details of a process of updating vacant seat information performed when the vacant seat information creation unit is provided with the information shown in FIG. 10(a).

FIG. 11 is a sequence diagram showing details of a process of updating vacant seat information when the vacant seat information creation unit 210 is provided with the information shown in FIG. 10(a). The process shown in the diagram is similar to that in the sequence diagram shown in FIG. 4, except for that a process of estimating a predicted vacancy start time (S111) is performed between the steps S102 and S103. In the step S111, the vacant seat information creation unit 210 determines an attribute (for example, a customer class) of a customer using a seat (table), by image processing. Then, by reading an average occupancy time associated with the attribute determined by image processing and adding the read average occupancy time to a time at which the seat (table) became occupied, the vacant seat information creation unit 210 creates a predicted vacancy start time.

Figure 12:
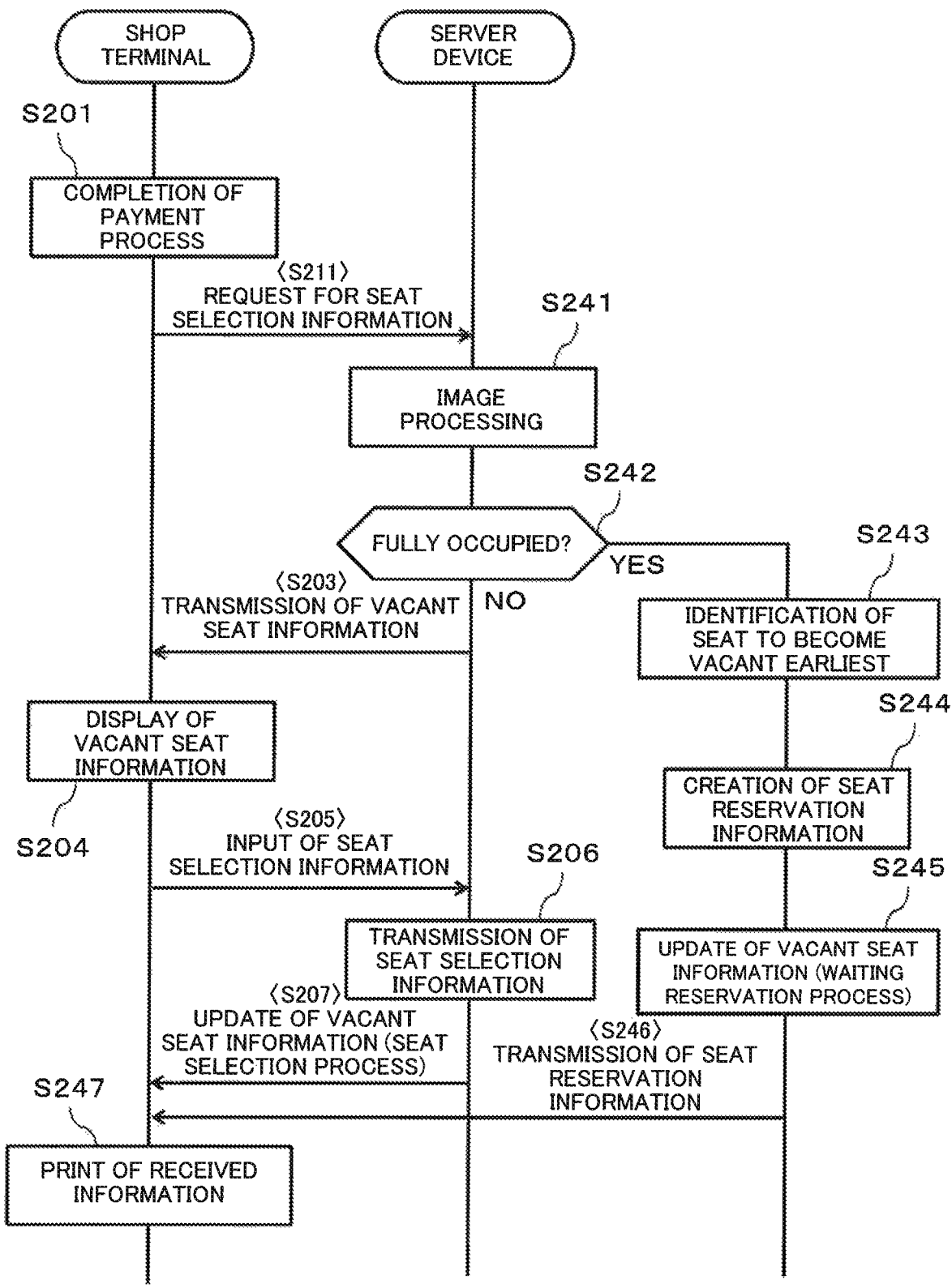
FIG. 12 is a sequence diagram showing operation of a server device and of a shop terminal.

FIG. 12 is a sequence diagram showing operation of the server device 20 and of the shop terminal 30, in the present example embodiment. In the present example embodiment, when a request for seat selection information is transmitted from the shop terminal 30 (S211) after completion of a payment process (S201), the vacant seat information creation unit 210 of the server device 20 starts processing of an image received from the imaging unit 10 (S241) and determines whether the seats are fully occupied or not (S242). If not fully occupied (NO at S242), the server device 20 and the shop terminal 30 performs processes shown as the steps S203 to S207 in FIG. 5

On the other hand, if fully occupied (YES at S242), the vacant seat information creation unit 210 identifies and read the table ID and seat ID of a seat whose predicted vacancy start time is the earliest among those stored in the vacant seat information storage unit 212 (S243), and using the read table ID and seat ID, creates seat reservation information (S244). The read table ID and seat ID are included in the seat reservation information. Then, the vacant seat information creation unit 210 increases by one a count number in the "waiting reservation information" associated with the table ID and seat ID read in the step S243, in the vacant seat information storage unit 212 (S245). Subsequently, the vacant seat information creation unit 210 transmits the created seat reservation information to the shop terminal 30 (S246).

Then, the shop terminal 30 prints the seat selection information which may have been transmitted in the step S207 or the seat reservation information which may have been transmitted in the step S246 (S247).

Functions and Effects of the Second Example Embodiment

As has been described above, according to the present example embodiment, similarly to the first example embodiment, vacant seat information can be corrected into an appropriate state by the use of an image received from the imaging unit 10. Further, the vacant seat information creation unit 210 calculates a time at which a currently occupied seat is predicted to become vacant (predicted vacancy start time) and stores it into the vacant seat information storage unit 212. As a result, when the seats are fully occupied, the vacant seat information storage unit 212 can select and reserve a seat which is predicted to become vacant earliest.

While the above description has been given of an example of operation where the vacant seat information creation unit 210 calculates an average occupancy time by the use of only the information shown in FIG. 10(a), the vacant seat information creation unit 210 may perform the calculation of an average occupancy time by the use of two or more of the kinds of information shown in FIGS. 10(a) to (c).

Third Example Embodiment

The seat reservation system 1 according to the present example embodiment is similar to the seat reservation system 1 according to the second example embodiment, except for that it can offer a coupon to a customer when the seats are fully occupied.

Figure 13:
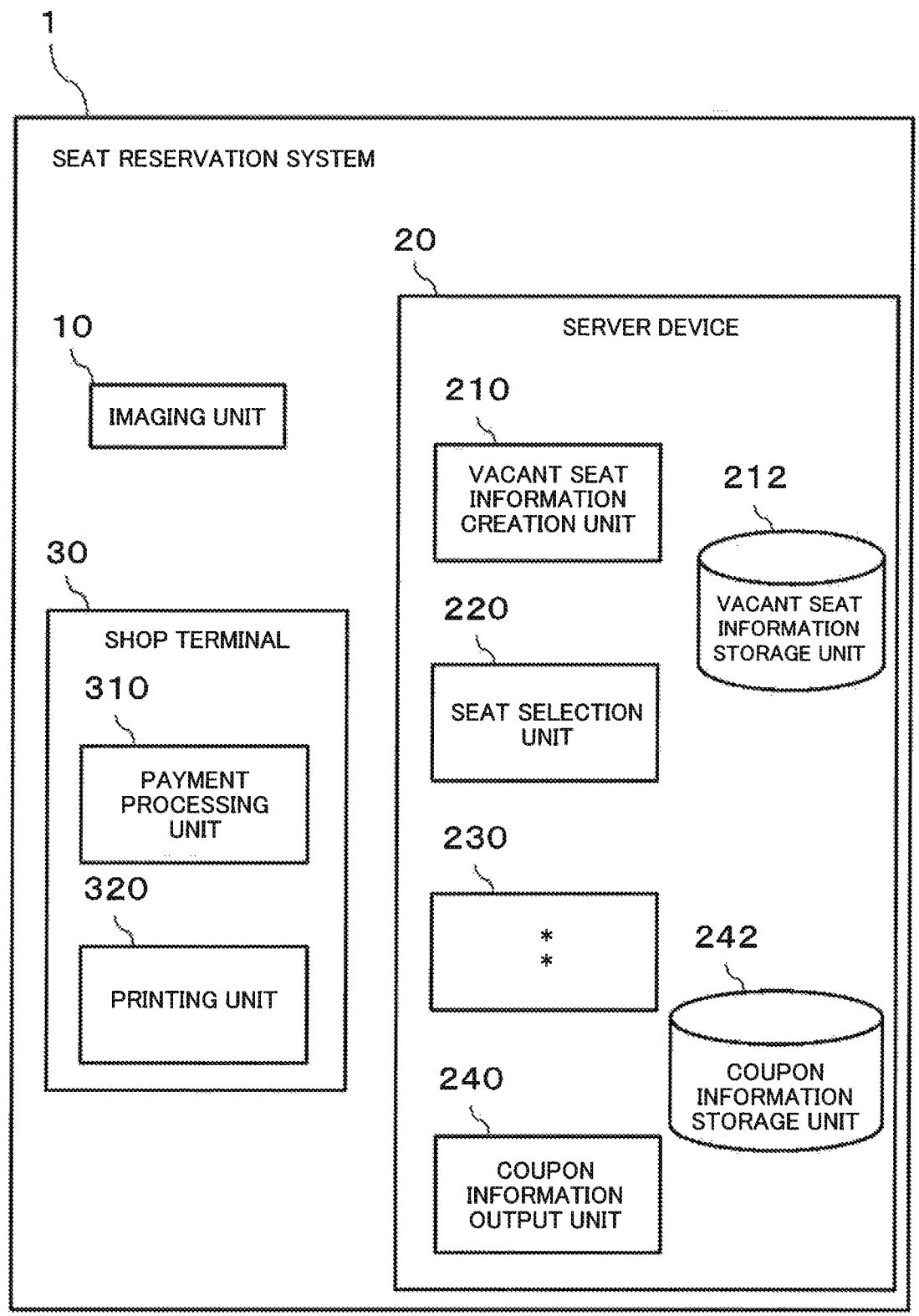
FIG. 13 is a block diagram conceptually showing a system configuration of a seat reservation system according to a third example embodiment.

FIG. 13 is a block diagram conceptually showing a system configuration of the seat reservation system 1 according to the present example embodiment. The seat reservation system 1 shown in the diagram is of a similar configuration to that of the seat reservation system 1 according to the second example embodiment, except for that the server device 20 includes a coupon information storage unit 242 and a coupon information output unit 240. The coupon information output unit 240 of the present example embodiment outputs coupon information to a customer when a waiting reservation process is performed by the seat selection unit 220.

The coupon information storage unit 242 stores pieces of information each on a coupon to be offered to a customer. When the seats are fully occupied, the coupon information output unit 240 selects a piece of information on a coupon to be offered to a customer, from those stored in the coupon information storage unit 242, and transmits the selected information to the shop terminal 30. The printing unit 320 of the shop terminal 30 prints the received information on a coupon. Details of the processes will be described later with reference to FIG. 15.

FIG. 14 is a diagram showing, in a table form, an example of information stored in the coupon information storage unit 242. In the example shown in the diagram, the coupon information storage unit 242 stores pieces of coupon information associated with respective ones of different time lengths (waiting times) since a time at which a reservation is made until a predicted vacancy start time. However, a data configuration of the coupon information storage unit 242 is not limited to the example shown in the diagram in FIG. 14.

Figure 15:
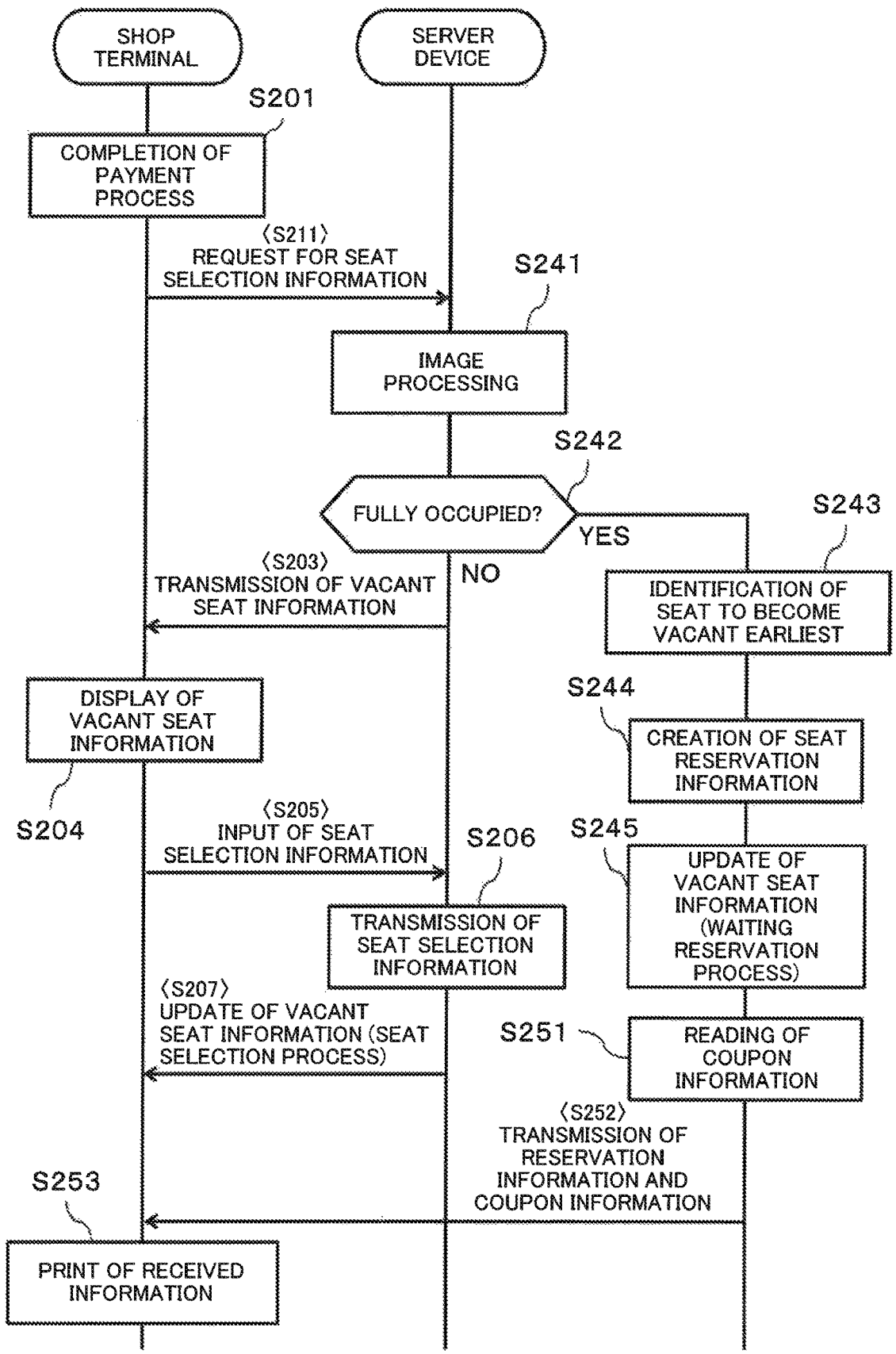
FIG. 15 is a sequence diagram showing operation of a server device and of a shop terminal.

FIG. 15 is a sequence diagram showing an example of operation of the server device 20 and of the shop terminal 30, in the present example embodiment. The sequence diagram shown in the present example embodiment is similar to that shown in FIG. 12, except for that processes of steps S251 and S252 are added.

Specifically, when the vacant seat information creation unit 210 has updated vacant seat information stored in the vacant seat information storage unit 212 (S245), the coupon information output unit 240 reads information on a coupon to be offered to a customer, from the coupon information storage unit 242 (S251). For example, when the coupon information storage unit 242 includes the data configuration shown in FIG. 14, the coupon information output unit 240 calculates a time length (waiting time) since a time at which the reservation was made until a predicted vacancy start time of the reserved seat, and reads information on a coupon associated with the calculated waiting time from the coupon information storage unit 242. Then, the coupon information output unit 240 transmits the read information on a coupon, along with the seat reservation information, to the shop terminal 30 (S252).

Accordingly, the printing unit 320 of the shop terminal 30 prints either the seat selection information which may have been transmitted in the step S207 or the seat reservation information and the information on a coupon which may have been transmitted in the step S252 (S253).

Functions and Effects of the Third Example Embodiment

As has been described above, according to the present example embodiment, similarly to the second example embodiment, vacant seat information can be corrected into an appropriate state by the use of an image received from the imaging unit 10. Further, when the seats are fully occupied, the vacant seat information storage unit 212 can select and reserve a seat which is predicted to become vacant earliest. Furthermore, in a case of full occupancy, coupon information can be offered to a customer. Accordingly, customers' satisfaction with the shop can be improved.

The example embodiments of the present invention has been described above with reference to the drawings, but they are merely examples of the present invention, and various configurations besides the above-described ones may also be employed.

Further, while a plurality of steps (processes) have been sequentially described in the flow charts or sequence diagrams referred to in the above descriptions, an execution order of steps performed in each of the example embodiments is not limited to the order described in the example embodiment. In each of the example embodiments, the order of steps illustrated in the corresponding diagram may be changed as long as there occurs no interference with the content. Further, the above-described example embodiments may be combined with each other as long as there occurs no confliction in the content.

The whole or part of the example embodiments disclosed above can be described as, but not limited to, the following supplementary notes.

1. An information processing device comprising:
    a vacant seat information creation means for creating vacant seat information indicating a vacant seat in a seat space, by processing an image received from an imaging means for capturing an image of the seat space;
    a seat selection means for performing a process of selecting a seat to be used by a customer, by the use of the vacant seat information and in collaboration with a POS (Point of Sale) device for handling payment for an item; and
    a seat information output means for outputting information indicating the selected seat.

2. The information processing device according to 1.,
    wherein the seat selection means,
    when the vacant seat information indicates a full occupancy state, performs a waiting reservation process on a seat for which a predicted vacancy start time estimated using occupancy start time information on each seat is the earliest, and
    wherein the seat information output means
    outputs information indicating the seat having been reserved by the waiting reservation process.

3. The information processing device according to 2.,
    further comprising a storage means for storing information representing an occupancy status for each seat and also information representing a waiting reservation for each seat.

4. The information processing device according to 2. or 3.,
    wherein the vacant seat information creation means
    estimates the predicted vacancy start time by the use of an average occupancy time associated with each day of a week or each time slot.

5. The information processing device according to any one of 2. to 4.,
    wherein the vacant seat information creation means
    analyzes a customer class of a customer currently using each seat, from an image received from the imaging means, and estimates the predicted vacancy start time by the use of an average occupancy time associated with each customer class.

6. The information processing device according to any one of 2. to 5.,
    wherein the vacant seat information creation means
    estimates the predicted vacancy start time by further use of a number of waiting reservations associated with each seat.

7. The information processing device according to any one of 2. to 6.,
    further comprising a coupon information output means for outputting coupon information when the waiting reservation process is performed.

8. A data processing method comprising:
    creating vacant seat information indicating a vacant seat in a seat space, by processing an image received from an imaging means for capturing an image of the seat space;
    performing a process of selecting a seat to be used by a customer, by the use of the vacant seat information and in collaboration with a POS (Point of Sale) device for handling payment for an item; and
    outputting information indicating the selected seat.

9. The data processing method according to 8., comprising:
    when the vacant seat information indicates a full occupancy state, performing a waiting reservation process on a seat for which a predicted vacancy start time estimated using occupancy start time information on each seat is the earliest; and
    outputting information indicating the seat having been reserved by the waiting reservation process.

10. The data processing method according to 9., comprising
    storing information representing an occupancy status for each seat and also information representing a waiting reservation for each seat.

11. The data processing method according to 9. or 10., comprising
    estimating the predicted vacancy start time by the use of an average occupancy time associated with each day of a week or each time slot.

12. The data processing method according to any one of 9. to 11., comprising
    analyzing a customer class of a customer currently using each seat, from an image received from the imaging means, and estimating the predicted vacancy start time by the use of an average occupancy time associated with each customer class.

13. The data processing method according to any one of 9. to 12., comprising
    estimating the predicted vacancy start time by further use of a number of waiting reservations associated with each seat.

14. The data processing method according to any one of 9. to 13., comprising
    outputting coupon information when the waiting reservation process is performed.

15. A program for causing a computer to function as:
    a vacant seat information creation means for creating vacant seat information indicating a vacant seat in a seat space, by processing an image received from an imaging means for capturing an image of the seat space;
    a seat selection means for performing a process of selecting a seat to be used by a customer, by the use of the vacant seat information and in collaboration with a POS (Point of Sale) device for handling payment for an item; and
    a seat information output means for outputting information indicating the selected seat.

16. The program according to 15.,
    for causing the computer to further function as:
    a means for, when the vacant seat information indicates a full occupancy state, performing a waiting reservation process on a seat for which a predicted vacancy start time estimated using occupancy start time information on each seat is the earliest; and
    a means for outputting information indicating the seat having been reserved by the waiting reservation process.

17. The program according to 16.,
    for causing the computer to further function as
    a storage means for storing information representing an occupancy status for each seat and also information representing a waiting reservation for each seat.

18.

The program according to 16. or 17., for causing the computer to further function as a means for estimating the predicted vacancy start time by the use of an average occupancy time associated with each day of a week or each time slot.

19.

The program according to any one of 16. to 18., for causing the computer to further function as a means for analyzing a customer class of a customer currently using each seat, from an image received from the imaging means, and estimating the predicted vacancy start time by the use of an average occupancy time associated with each customer class.

20.

The program according to any one of 16. to 19., for causing the computer to further function as a means for estimating the predicted vacancy start time by further use of a number of waiting reservations associated with each seat.

21.

The program according to any one of 16. to 20., for causing the computer to further function as a coupon information output means for outputting coupon information when the waiting reservation process is performed.

22.

A seat reservation system comprising:

an imaging means for capturing an image of a seat space;

a POS (Point of Sale) device configured to handle payment for an item; and an information processing device, wherein the information processing device comprises:

a vacant seat information creation means for creating vacant seat information indicating a vacant seat in the seat space, by processing an image received from the imaging means;

a seat selection means for performing a process of selecting a seat to be used by a customer, by the use of the vacant seat information and in collaboration with the POS (Point of Sale) device; and a seat information output means for outputting information indicating the selected seat.

23.

The seat reservation system according to 22., wherein the seat selection means, when the vacant seat information indicates a full occupancy state, performs a waiting reservation process on a seat for which a predicted vacancy start time estimated using occupancy start time information on each seat is the earliest, and wherein the seat information output means outputs information indicating the seat having been reserved by the waiting reservation process.

24.

The seat reservation system according to 23., further comprising a storage means for storing information representing an occupancy status for each seat and also information representing a waiting reservation for each seat.

25.

The seat reservation system according to 23. or 24., wherein the vacant seat information creation means estimates the predicted vacancy start time by the use of an average occupancy time associated with each day of a week or each time slot.

26.

The seat reservation system according to any one of 23. to 25., wherein the vacant seat information creation means analyzes a customer class of a customer currently using each seat, from an image received from the imaging means, and estimates the predicted vacancy start time by the use of an average occupancy time associated with each customer class.

27.

The seat reservation system according to any one of 23. to 26., wherein the vacant seat information creation means estimates the predicted vacancy start time by further use of a number of waiting reservations associated with each seat.

28.

The seat reservation system according to any one of 23. to 27., further comprising a coupon information output means for outputting coupon information when the waiting reservation process is performed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-195037, filed on Sep. 30, 2015, the disclosure of which is incorporated herein in its entirety by reference.

REFERENCE SIGNS LIST

1 seat reservation system
10 imaging unit
20 server device
210 vacant seat information creation unit
212 vacant seat information storage unit
220 seat selection unit
230 seat information output unit
240 coupon information output unit
242 coupon information storage unit
30 shop terminal
310 payment processing unit
320 printing unit

What is claimed is:

1. An information processing device comprising:
a memory storing one or more instructions; and
a processor configured to execute the one or more instructions to implement:
a vacant seat information creation unit, which creates vacant seat information indicating a vacant seat in a seat space, by processing an image received from an imaging unit which captures an image of the seat space, wherein the vacant seat information creation unit further determines, by processing the image, occupancy start time information indicating a time at which a seat is occupied by a user;
a seat selection unit, which performs a process of selecting a seat to be used by a customer, by the use of the vacant seat information and the occupancy start time, and in collaboration with a Point of Sale (POS) device for handling payment for an item; and
a seat information output unit, which performs a process of outputting information about a seat number and a map indicating a position of the selected seat to a mobile terminal of the customer, wherein the seat selection unit identifies an area of low customer density from the vacant seat information created by processing the image received from the imaging unit and selects a seat in the identified area, wherein the vacant seat information creation unit creates the vacant seat information by detecting an object at a region corresponding to the seat, and wherein the object is a tray.

2. The information processing device according to claim 1, wherein the seat selection unit, when the vacant seat information indicates a full occupancy state, performs a waiting reservation process on a seat for which a predicted vacancy start time estimated using occupancy start time information on each seat is the earliest, and wherein the seat information output unit outputs information indicating the seat having been reserved by the waiting reservation process.

3. The information processing device according to claim 2, further comprising a storage unit which stores information representing an occupancy status for each seat and also information representing a waiting reservation for each seat.

4. The information processing device according to claim 2, wherein the vacant seat information creation unit estimates the predicted vacancy start time by the use of an average occupancy time associated with each day of a week or each time slot.

5. The information processing device according to claim 2, wherein the vacant seat information creation unit analyzes a customer class of a customer currently using each seat, from an image received from the imaging unit, and estimates the predicted vacancy start time by the use of an average occupancy time associated with each customer class.

6. The information processing device according to claim 2, wherein the vacant seat information creation unit estimates the predicted vacancy start time by further use of a number of waiting reservations associated with each seat.

7. The information processing device according to claim 2, further comprising a coupon information output unit which outputs coupon information when the waiting reservation process is performed.

8. The information processing device according to claim 1, wherein the vacant seat information creation unit creates the vacant seat information by detecting an object corresponding to a user at a region corresponding to the seat.

9. The information processing device according to claim 1, wherein the seat selection unit, when the vacant seat information indicates a full occupancy state, performs a waiting reservation process based on the occupancy start time information.

10. A data processing method comprising:

creating, by a processor, vacant seat information indicating a vacant seat in a seat space, by processing an image received from an imaging unit which captures an image of the seat space, wherein the vacant seat information creation unit further determines, by processing the image, occupancy start time information indicating a time at which a seat is occupied by a user;

performing, by the processor, a process of selecting a seat to be used by a customer, by the use of the vacant seat information and the occupancy start time, and in collaboration with a Point of Sale (POS) device for handling payment for an item; and outputting, by the processor, information about a seat number and a map indicating a position of the selected seat to a mobile terminal of the customer, wherein the performing the process of selecting the seat comprises identifying, by the processor, an area of low customer density from the vacant seat information created by processing the image received from the imaging unit and selects a seat in the identified area, wherein the creating the vacant seat information comprises creating the vacant seat information by detecting an object at a region corresponding to the seat, and wherein the object is a tray.

11. The data processing method according to claim 10, wherein, when the vacant seat information indicates a full occupancy state, performing a waiting reservation process on a seat for which a predicted vacancy start time estimated using occupancy start time information on each seat is the earliest; and outputting information indicating the seat having been reserved by the waiting reservation process.

12. The data processing method according to claim 11, wherein, storing information representing an occupancy status for each seat and also information representing a waiting reservation for each seat.

13. The data processing method according to claim 11, wherein, estimating the predicted vacancy start time by the use of an average occupancy time associated with each day of a week or each time slot.

14. The data processing method according to claim 11, wherein, analyzing a customer class of a customer currently using each seat, from an image received from the imaging unit, and estimating the predicted vacancy start time by the use of an average occupancy time associated with each customer class.

15. The data processing method according to claim 11, wherein, estimating the predicted vacancy start time by further use of a number of waiting reservations associated with each seat.

16. The data processing method according to claim 11, wherein, outputting coupon information when the waiting reservation process is performed.

17. A non-transitory recording medium storing a program for causing a computer to function as:

a vacant seat information creation unit which creates vacant seat information indicating a vacant seat in a seat space, by processing an image received from an imaging unit which captures an image of the seat space, wherein the vacant seat information creation unit further determines, by processing the image, occupancy start time information indicating a time at which a seat is occupied by a user;

a seat selection unit which performs a process of selecting a seat to be used by a customer, by the use of the vacant seat information and the occupancy start time, and in collaboration with a Point of Sale (POS) device for handling payment for an item; and a seat information output unit which outputs information about a seat number and a map indicating a position of the selected seat to a mobile terminal of the customer, wherein the seat selection unit identifies an area of low customer density from the vacant seat information created by processing the image received from the imaging unit and selects a seat in the identified area, wherein the vacant seat information creation unit creates the vacant seat information by detecting an object at a region corresponding to the seat, and wherein the object is a tray.

18. A seat reservation system comprising:

an imaging unit which captures an image of a seat space;

a Point of Sale (POS) device for handling payment for an item; and the information processing device comprises a vacant seat information creation unit which creates vacant seat information indicating a vacant seat in a seat space, by processing an image received from an imaging unit which captures an image of the seat space, wherein the vacant seat information creation unit further determines, by processing the image, occupancy start time information indicating a time at which a seat is occupied by a user;

a seat selection unit which performs a process of selecting a seat to be used by a customer, by the use of the vacant seat information and the occupancy start time, and in collaboration with a POS (Point of Sale) device for handling payment for an item; and a seat information output unit which performs a process of outputting information about a seat number and a map indicating a position of the selected seat to a mobile terminal of the customer, wherein the seat selection unit identifies an area of low customer density from the vacant seat information created by processing the image received from the imaging unit and selects a seat in the identified area, wherein the vacant seat information creation unit creates the vacant seat information by detecting an object at a region corresponding to the seat, and wherein the object is a tray.

* * * * *